United States Patent
Brunt et al.

(10) Patent No.: US 7,069,193 B2
(45) Date of Patent: *Jun. 27, 2006

(54) COLOR VISUALIZATION SYSTEM

(76) Inventors: Richard David Brunt, Lynton, Mossy Vale, Maidenhead, Berkshire SL6 7RX (GB); Andrew Godfrey Ratcliff, 1 Clappers Meadow, Maidenhead, Berkshire SL6 8TT (GB); Christopher Harris, Long House, Alleyns Lane, Cookham, Berkshire SL6 9AD (GB)

( * ) Notice: Subject to any disclaimer, the term of this patent is extended or adjusted under 35 U.S.C. 154(b) by 862 days.

This patent is subject to a terminal disclaimer.

(21) Appl. No.: 09/776,260

(22) Filed: Feb. 5, 2001

(65) Prior Publication Data

US 2001/0049591 A1    Dec. 6, 2001

(30) Foreign Application Priority Data

Jun. 1, 2000  (GB) ................. 0013164.9

(51) Int. Cl.
*G06F 17/50*    (2006.01)
(52) U.S. Cl. ............................. 703/1; 434/72
(58) Field of Classification Search ............ 703/1, 703/2; 434/72–76, 78–79
See application file for complete search history.

(56) References Cited

U.S. PATENT DOCUMENTS

| | | | |
|---|---|---|---|
| 6,524,107 B1* | 2/2003 | Brown | 434/72 |
| 2001/0047250 A1* | 11/2001 | Schuller et al. | 703/1 |
| 2001/0049591 A1* | 12/2001 | Brunt et al. | 703/1 |

FOREIGN PATENT DOCUMENTS

| | | |
|---|---|---|
| EP | 0468126 | 1/1992 |
| EP | 0794517 | 9/1997 |
| FR | 2702291 | 9/1994 |
| WO | WO 98/47106 | 10/1998 |
| WO | WO 00/17818 | 3/2000 |

* cited by examiner

*Primary Examiner*—Russell Frejd

(57) ABSTRACT

A method for producing a color recommendation for a structure or part of a structure to be painted which comprises selecting from a database containing images of structural archetypes stored on storage means of an archetype image that closely matches the structure to be painted, selecting a color or colors from a database comprising colors stored on storage means and applying the color or colors to the archetype to produce a color scheme and displaying the structure or part of the structure with the color applied.

18 Claims, 1 Drawing Sheet

COLOR VISUALIZATION SYSTEM

CROSS-REFERENCE TO RELATED APPLICATION

This application also claims the benefit of priority under 35 U.S.C. 119 to United Kingdom Patent Application No. 0013164.9, filed on Jun. 1, 2000.

BACKGROUND OF THE INVENTION

This invention relates to a method for producing colour recommendations for painting a structure or part of a structure for example the interior or exterior of a building, a motor vehicle, mobile home or ship.

The difficulty in selecting colours or colour schemes for structures described above is visualising the appearance of the structure when painted in a particular colour scheme. Generally colour schemes are designed from colour charts and paint swatches provided by paint companies. The problem is that such colour charts and swatches are relatively small in relation to the structure or part of a structure as a whole and so prevent an accurate impression being obtained of the finished work.

We have now found that colour schemes can be produced more satisfactorily, and therefore will give more acceptable results particularly to DIY consumers when it is possible to see at least approximately how the whole of a structure or part of a structure will appear when a colour scheme has been applied to it.

BRIEF SUMMARY OF THE INVENTION

A method for producing a colour recommendation for a structure or part of a structure to be painted which comprises selecting from a database containing images of structural archetypes stored in electronic format on storage means an archetype image that closely matches the structure to be painted, selecting a colour or colours from a database comprising colours stored on in electronic format on storage means, applying the colour or colours to the image to produce a colour scheme and displaying the structure or part of a structure with the colour applied and providing information from which paint corresponding to the colour or colours in the colour scheme can be identified.

DETAILED DESCRIPTION OF THE INVENTION

Figure 1:
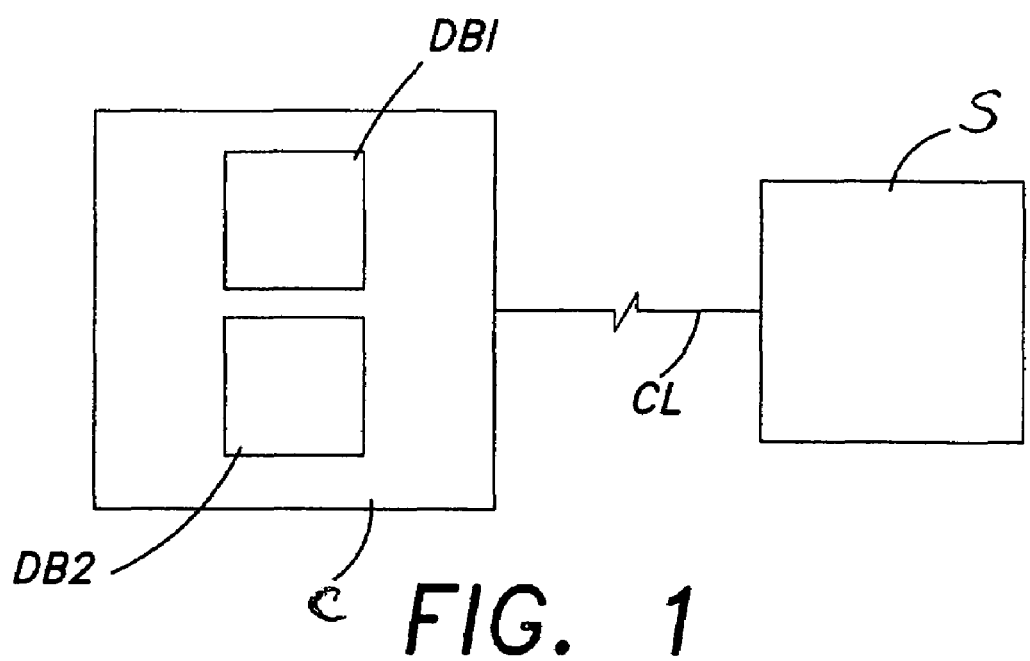
FIG. 1, is a schematic diagram of the process and systems of an embodiment of the present.

By a structural archetype is meant an image of a structure or part of a structure that is representative of a particular design or style of architecture or design or style of architecture that is common or popular. Preferably there are sufficient archetypes in the database such that the user can choose one that has some resemblance to the structure he wishes to decorate.

In particular the structural archetypes can be images of a building. In particular the images can be of the exterior of a house for example the front elevation showing a front wall with front windows a front door and a roof, or a diagonal view showing the front and one side in elevation or a rear elevation, or a diagonal view showing a side and rear elevation.

The structural archetype can be an image of the interior of a house, for example a bedroom, a bathroom, a kitchen, a living room, a dining room or hall.

Preferably the database contains a number of archetypes in different structural styles. For example the exterior can be in the Tudor, Gothic, Edwardian or a modem style.

Similarly the interior can be in a classic or modem style.

In particular separate areas of the archetype can be coloured separately one from another. For example the separate areas can be walls, doors, coving, ceilings, dado rails, skirting boards, window frames, window sills or fireplaces. Where the part of a structure is a room, it may also contain furniture or furnishings such as curtains, carpets, sanitary ware, chairs and sofas on which there can be covers or cushions.

In a preferred embodiment colour can be applied separately to the structure or part of the structure and to the furniture and furnishings.

Preferably the images are of photographic quality.

With regard to the database containing colours, the colours can be grouped alphabetically by colour name or assembled in groups where the colours are complimentary or contrasting one with another.

The database containing the archetype images and the colours are stored on a storage means for storing data on a storage medium. Examples of suitable storage means include magnetic disks such as the hard disk of a personal computer or a so called floppy disk; and optical disks such as compact disks.

Access to the database can be remote for example via communication lines (CL of FIG. 1) such as a local or wide area network. In a preferred embodiment of this invention remote access is via the Internet.

The user can indicate the selection made by, for example, clicking a mouse button, touching the screen or using voice activation.

The colour scheme produced by this method can be printed out as a photographic quality print or as a message specifying the colour by name or other indicator and the source from which it can be purchased or a combination thereof.

In particular also where there is remote access to the database the user access point can include means to supply an image of the structure or structural component to be coloured on a suitable storage means. Examples of suitable storage means include floppy disks and compact disks.

The invention will now be described with reference to the following embodiments.

Embodiment 1

The database (DB1 of FIG. 1) contianing the images of the structural archetype is stored on the hard disk of a personal computer (C of FIG. 1). The database (DB2 of FIG. 1) contianing the colours, their names and other reference information relating to them is also stored on the same hard disk. Using a combination of images and written words displayed on a touch sensitive screen (S of FIG. 1) the user is invited to select from a number of different interior and exterior structural archwetypes, the structural archetype to be painted by touching the screen. The structural archetype selected is displyed on the screen with the available choice of coulors accessed by touching the screen. The user selected the colour on the screen. The computer fills in the area of the image with the chosen colour and displays it. The user may print the screen image of the structural archetype, including any other information relating to the colour or colours selected, on the photographic quality printer connected to the computer.

Embodiment 2

The method of Embodiment 1 is followed except that the databases for the structural archetypes and the colours are stored on a compact disk.

Embodiment 3

The method of Embodiment 1 is followed except that the user provides the image of the structure to be painted in a format capable of being inputted to the computer.

What is claimed is:

1. A method for producing a colour recommendation for a structure or part of a structure to be painted which comprises:
   a) selecting from a database containing images of structural archetypes stored in electronic format on storage means an archetype image that closely matches the structure to be painted,
   b) selecting a colour or colours from a database comprising colours stored on in electronic format on storage means wherein the colours are grouped by colour names or in groups where the colours are either complementary or contrasting one with another;
   c) applying the colour or colours to the image to produce a colour scheme and
   d) displaying the structure or part of a structure with the colour applied and providing information from which paint corresponding to the colour or colours in the colour scheme can be identified.

2. A method according to claim 1, where the structural archetypes are images of a building.

3. A method according to claim 2, where the image is an interior of a building.

4. A method as claimed in claim 2, where the building is an exterior of a house.

5. A method according to claim 1, where separate areas of the archetypes can be coloured separately one from another.

6. A method according to claim 5, where the archetype is an interior of a building and the separate areas are walls, doors, coving, ceiling, dado rails, skirting boards, window frames, sills and fireplaces.

7. A method according to claim 1, where the archetype is an interior of a building and also contains furniture or furnishings.

8. A method according to claim 7, where colour can be applied separately to the furniture or furnishings.

9. A method according to claim 1, where the images are photographic quality.

10. A method according to claim 1, where there is remote access to the database.

11. A method according to claim 10, where access is via the Internet.

12. A method according to claim 1, where a user can enter into the method from his point of access, the image to be coloured in electronic form.

13. A method according to claim 1, which includes printing the colour recommendation for a structure or part of a structure as photographic quality print.

14. A method according to claim 13, wherein the message includes a source from which the paint can be purchased.

15. A method according to claim 1, which includes printing the colour recommendation for a structure or part of a structure as a message specifying the colour or colours by an indicator.

16. A method according to claim 15, wherein the message includes a source from which the paint can be purchased.

17. A method according to claim 1, wherein the storage means is selected from floppy discs or compact discs.

18. A method for producing a colour recommendation for a structure or part of a structure to be painted which comprises
   a) selecting from a database containing images of structural archetypes stored in electronic format on storage means an archetype image that closely matches the structure to be painted,
   b) selecting a colour or colours from a database comprising colours stored on in electronic format on storage means wherein the colours are grouped by colour names or in groups where the colours are either complementary or contrasting one with another so that a user can select by clicking a mouse button, touching the screen, or using voice activation to pick the colour name or complementary or contrasting color;
   c) applying the colour or colours to the image to produce a colour scheme, and
   d) displaying the structure or part of a structure with the colour applied and providing information from which paint corresponding to the colour or colours in the colour scheme can be identified.

* * * * *